INVENTOR
HEINZ HUNSDIECKER
BY MICHAEL STRIKER
his ATTORNEY

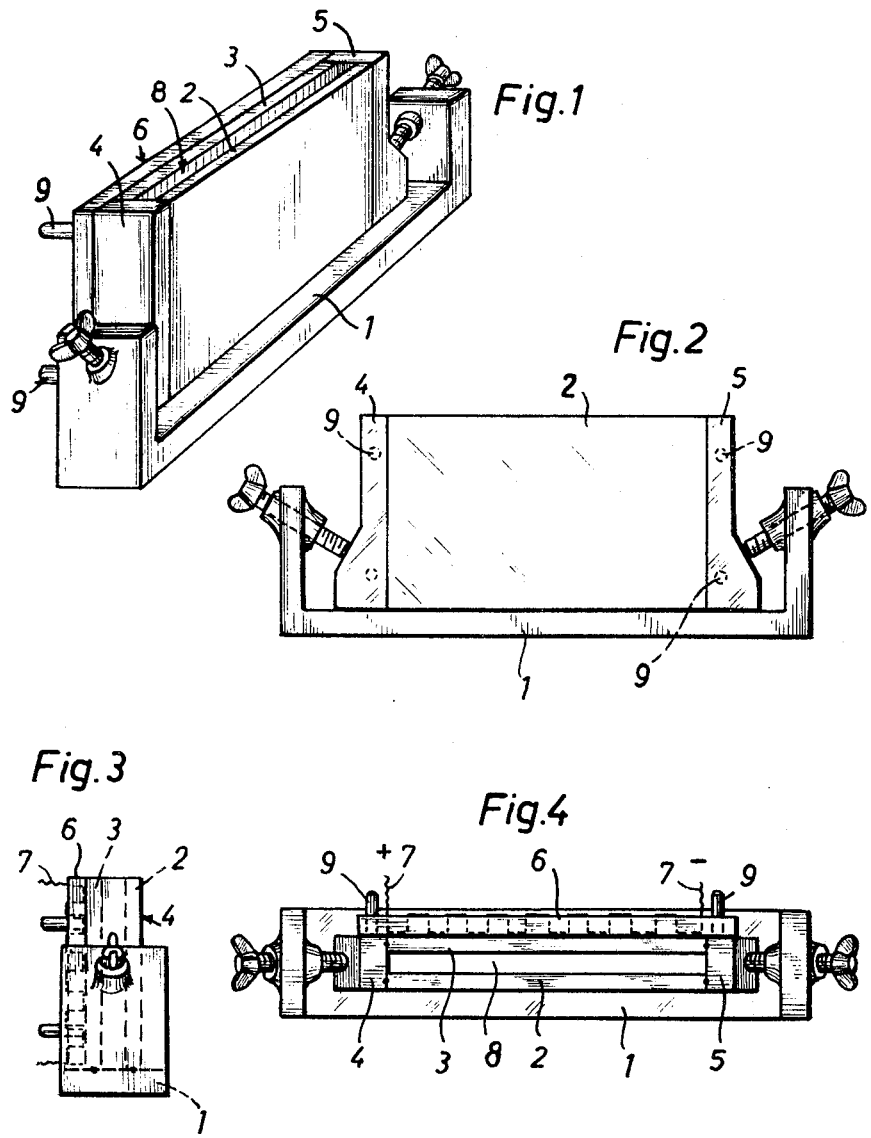

April 21, 1970     H. HUNDSDIECKER     3,507,938
METHOD FOR PRODUCING SHAPED ARTICLES OF HARDENED SYNTHETIC RESIN
HAVING A PIGMENT PATTERN INCORPORATED THEREIN
Original filed April 6, 1964     6 Sheets-Sheet 3

INVENTOR
HEINZ HUNSDIECKER
BY MICHAEL STRIKER
his ATTORNEY

Fig.10a
Fig.10b
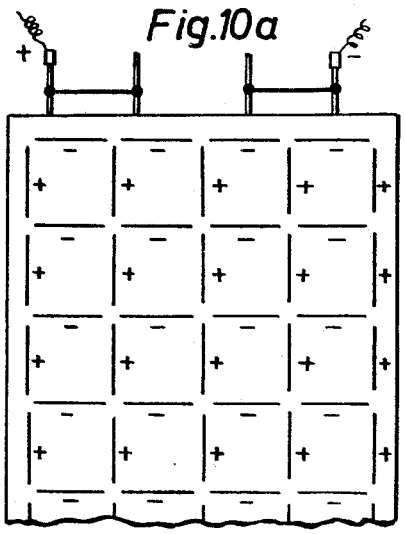
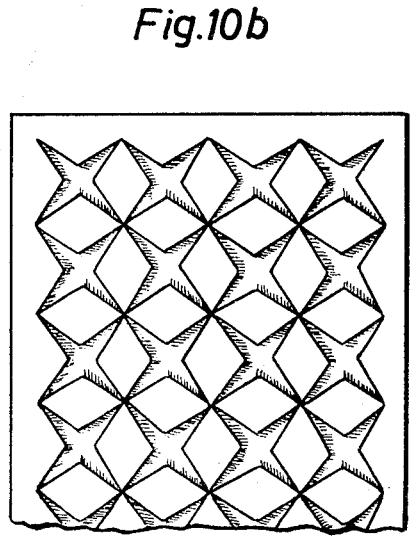
Fig.11a
Fig.11b
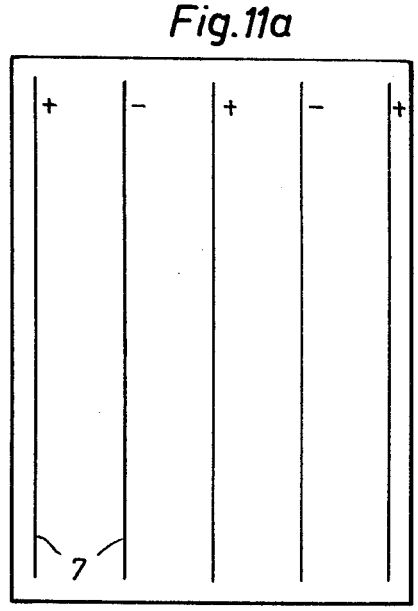
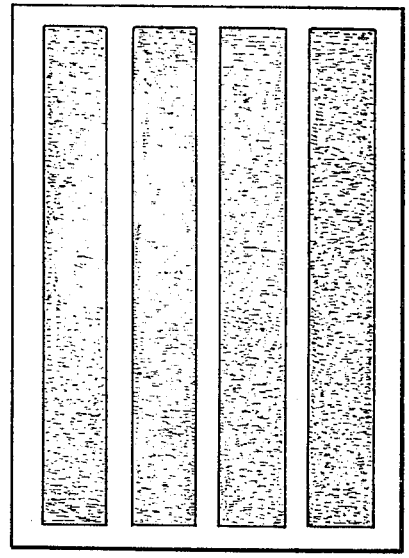
INVENTOR
HEINZ HUNSDIECKER
BY MICHAEL STRIKER
his ATTORNEY April 21, 1970   H. HUNDSDIECKER   3,507,938
METHOD FOR PRODUCING SHAPED ARTICLES OF HARDENED SYNTHETIC RESIN
HAVING A PIGMENT PATTERN INCORPORATED THEREIN
Original Filed April 6, 1964   6 Sheets-Sheet 5

INVENTOR
HEINZ HUNSDIECKER
BY MICHAEL STRIKER
his ATTORNEY

April 21, 1970 H. HUNDSDIECKER 3,507,938
METHOD FOR PRODUCING SHAPED ARTICLES OF HARDENED SYNTHETIC RESIN
HAVING A PIGMENT PATTERN INCORPORATED THEREIN
Original filed April 3, 1964 6 Sheets-Sheet 6

INVENTOR
HEINZ HUNSDIECKER
BY MICHAEL STRIKER
his ATTORNEY

United States Patent Office 3,507,938
Patented Apr. 21, 1970

3,507,938
METHOD FOR PRODUCING SHAPED ARTICLES OF HARDENED SYNTHETIC RESIN HAVING A PIGMENT PATTERN INCORPORATED THEREIN
Heinz Hundsdiecker, Donauweg 27, Junkersdorf, near Cologne, Germany
Continuation of application Ser. No. 357,835, Apr. 6, 1964. This application June 12, 1968, Ser. No. 744,600
Int. Cl. B29c 11/00; B29d 3/02
U.S. Cl. 264—24                    6 Claims

ABSTRACT OF THE DISCLOSURE

A pattern is produced in a body having a substantially flat face and formed of a hardenable synthetic resin having electrically orientable particles distributed therein, by placing, adjacent to the flat face and spaced from each other, at least two electric field generating electrode means each including an electrode and the means having different potentials so as to create within the body between the electrodes a curved electric field of force, whereby the electrically orientable particles in the hardenable synthetic resin will assume in the regions of the electrodes a steep angle of inclination relative to the flat face and will be directed halfway between the electrodes substantially parallel to the flat face so as to form within the hardenable synthetic resin body a substantially arc-shaped pattern of electrically orientable particles curved relative to the flat face of the body, and thereafter hardening the hardenable synthetic resin.

CROSS-REFERENCES TO RELATED APPLICATIONS

The present application is a continuation of my copending application Ser. No. 357,835, filed Apr. 6, 1964 and entitled "A Method for Producing Articles of Hard-Setting Synthetic Material to Which Orientable Pigment Particles Have Been Added."

BACKGROUND OF THE INVENTION

This invention relates to a method and device for producing articles of synthetic material, patterned in themselves by pigmentation.

It is known to produce in hard-setting synthetic substances pearl-like or mother-of-pearl-like effects by adding pigments in the shape of platelet or rod-like crystals to the synthetic substance while the latter is still fluid and by partially orienting these crystals which are homogeneously distributed in the synthetic substance by mechanical means, for example stirring. During this process the longitudinal axes become aligned parallel to the direction of flow. As the longitudinal axes of the crystals become oriented parallel to the surface of the article in a certain region of the synthetic substance, the crystals will strongly reflect the light in this region, whereas in other regions, in which the longitudinal axes of the crystals are perpendicular to the surface, light is reflected only to a small extent. The partial orientation of the crystallic pigments achieved in flow processes of this kind cannot be controlled, so that the structures or internal patterns which can be achieved are only accidental results.

It is also known to orient parallel with each other strongly reflecting crystallic pigments in a hard-setting fluid synthetic substance by means of an electric or magnetic field, in order to obtain maximum reflection, and thus maximum gloss of the admixed synthetic pigments. In the production of rods or sheets from hard-setting synthetic resins, this process enables the embedded crystallic platelets or needles to be oriented uniformly and without structure. The process exploits the fact that crystals as well as other pigments have an inherent dipole moment, or that under the influence of the electric field such a dipole moment is imparted to them.

The present invention has for its object to develop a method and device for producing particles from hard-setting transparent synthetic materials by means of which the embedded pigments, prior to setting, can be oriented in such a way that a predetermined pattern, design or configuration is achieved.

SUMMARY OF THE INVENTION

The present invention proposes to produce a pattern in a body having a substantially flat face and formed of a hardenable synthetic resin having electrically orientable particles distributed therein, by placing adjacent to the flat face and spaced from each other at least two electric field generating electrode means each including an electrode and the means having different potentials so as to create within the body between the electrodes a curved electric field of force in such a manner that the lines of electric force will enter the flat face of the body at a steep angle and curve within the body so as to be located halfway between the electrode substantially parallel to the flat face, whereby the electrically orientable particles in the hardenable synthetic resin will assume in the regions of the electrodes a steep angle of inclination relative to the flat face and will be directed halfway between the electrodes substantially parallel to the flat face with the angles of inclination between the flat face and the respective particles decreasing from the angle of inclination of those particles which are located in the regions of the electrodes to the angle of inclination of those particles which are located halfway between the electrodes so as to form within the hardenable synthetic resin body a substantially arc-shaped pattern of electrically orientable particles curved relative to the flat face of the body, and thereafter hardening the hardenable synthetic resin so as to form a body of hardened synthetic resin with the particles firmly embedded therein and forming a substantially arc-shaped pattern curved relative to the flat face of the body.

The electrically orientable particles generally will be pigment particles and the electric field preferably may be an alternating field generated by a potential of between 100 and 30,000 volts.

The present invention also is concerned with a device for carrying out the above described method, which device comprises mold means including mold walls of electrically non-conductive material, at least one of the mold walls having a substantially flat inner face, the mold walls defining in their interior a molding space adapted to receive a liquid, hardenable synthetic resin having electrically orientable particles distributed therein, at least two electric field generating electrode means each including an electrode arranged, spaced from each other and spaced from the molding space, within the zone of the one mold wall so that upon application of a potential difference to the electrode means a curved electric field of force will be created within the synthetic hardenable resin in the molding space in such a manner that the lines of electric force will enter through the flat face of the one mold wall into the synthetic resin at steep angles and curve within the same so as to be located halfway between the electrodes substantially parallel to the flat face, thereby causing corresponding orientation of the electrically orientable particles in the resin in a substantially arc-shaped pattern, and means for applying the potential difference to the electric field generating electrode means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of a mold for producing sheets of synthetic resin according to the invention;

FIG. 2 is a front elevation;

FIG. 3 is an end view, and

FIG. 4 is a plan view of the device illustrated in FIG. 1;

FIGS. 7a, 7b, 8a, 8b, 9a, 9b, 10a, 10b, 11a, 11b, 12a, 12b, 13a and 13b show, in each case, an insulating sheet with differently arranged charging devices, and, adjacent thereto in each case, a pattern produced in the transparent synthetic sheet with the given charging arrangement.

FIG. 17 is a sectional elevation of, and

DESCRIPTION OF THE PREFERRED EMBODIMENTS

Figure 6:
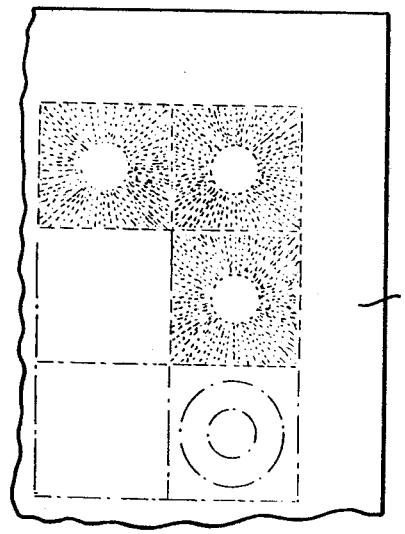
FIG. 6 is an elevational view of a sheet of synthetic material produced in the device shown in FIG. 5.

According to the invention, a mold consisting of an electrically non-conductive material is filled with a homogeneous fluid synthetic substance with which pigment particles have been mixed, and charging devices arranged in accordance with the desired patterns, designs or configurations are arranged at least at one wall of the mold and charged negatively and/or positively with a potential of 100 to 30,000 volts, so that the lines of force produced by these devices will be three-dimensionally curved as they penetrate into the mold; and the synthetic substance is processed in such a way that it congeals or sets only when the orientation of the pigment particles, effected by the fields of force emanating from the charging devices, is complete.

If the charging devices and their charges are suitably arranged, this process enables the pigments to be oriented in accordance with the three-dimensionally curved path of the lines of force in such a way that astonishing optical effects can be achieved which, optically, appear as spherical, toroidal, cushion or similar three-dimensional shapes. Also, geometric patterns, letters, numbers, characters etc. composed of these basic shapes can be created. Articles produced from synthetic material in this manner exhibit a pattern in the wall of the article which is determined by the path or paths taken by the fields of force, or rather the lines of force composing the latter, which emanate from the charging devices, for example capacitors or electric conductors. Hard-setting synthetic materials suitable for carrying out this method are for example polyesters, epoxy resins, thermoplastic phenol resins, pre-polymerized methyl methacrylate, pre-polymerized styrene etc.

Pigment particles may be for example crystalline white lead, acid lead phosphate, acid lead arsenate, crystalline guanine, orientable chromium oxide or iron oxide etc. An addition of .01 to 5% by weight of such pigment particles is admixed to the hard-setting transparent synthetic substance.

The above-mentioned effects are particularly marked in the case of pigments such as bronze or pearl essence, because here the flat surfaces of the pigment particles are characterized by high light reflection. But also pigments such as chromium oxide, iron oxide, organic pigments etc. yield attractive structures and designs, provided that the pigment particles are all elongated or flat-shaped.

The capacitors should not be actually submerged in the hard-setting pigmented synthetic substance, or touch the latter, because then a turbulent particle movement is initiated because of the attraction and repulsion or migration in the electric field. The electric conductors must be separated from the synthetic substance by a solid non-conducting wall. Thus, glass molds may be used, for example, which are provided externally with wires, metal discs or metal cut outs in any desired manner, acting as charging devices. So-called wire glass or safety glass may also be employed into which a wire structure has been fused. The charging devices, i.e. capacitors or electric conductors may also be separated from the wall of the mold by a layer of insulating dielectric if this layer is not too thick. If the capacitors are spaced apart from the resins by too great a distance, the design will be blurred because the strength of the field decreases with distance.

Obviously, alternating current may be employed instead of direct current, since the path taken of the lines of force is not affected by the type of current.

The walls of the mold, the synthetic material and the entire apparatus must be dry. Small amounts of water or water droplets cause faults, because the conductivity of water leads to unintentional current leakage or to an uncontrollable discharge of the pigment particles. Screening, deflection or disturbance of a field by electrically conducting bodies may be turned to advantage for example when certain portions of the article to be produced are to be shielded from the influence of the fields of force.

Sometimes the ornaments, structures etc. may be altered in a desired manner by the additional employment of independent magnetic fields which distort or influence the given electric field.

In an apparatus for carrying out the method of the invention, the walls of the mold consist of an electrically non-conductive material, and electric charging devices are arranged at least adjacent one wall of the mold, the lines of force of the said device being three-dimensionally curved as they penetrate into the mold. The charging devices may be capacitors having the shape of narrow bands, points, rings, discs etc. Also, conductors through which a curent flows may serve as charging devices. The charging devices may either be applied directly to the wall of the mold or applied thereto with an interposed dielectric having a relative dielectric constant greater than 2. Thus, the dielectric may be for example carbon tetrachloride, ethylene perchloride, methyl isobutyl ketone, dibutyl phthalate etc.

Preferably, the charging devices are worked into an insulating sheet according to the desired pattern, and the sheet is capable of being applied to a wall of the mold. Particularly accurate and effective patterns result when positively and negatively charged devices are arranged parallel to one another. Depending upon the distance between the charging elements and upon the quality of the insulation, the potential applied to the charging devices may vary from 100 to 30,000 volts.

The charging devices may also consist of areas "painted" in known manner on a sheet consisting of a non-conducting material. The "ink" used in this process consists of electrically well-conducting paste-like substances.

The insulating sheet on which the charging devices, i.e. capacitors or electric conductors, are provided is preferably supported in interchangeable and settable manner.

Referring now to the drawing, the device illustrated in FIGS. 1 to 4 for producing synthetic sheets patterned in themselves consists of a base plate 1, two mold walls 2 and 3, and two end walls 4 and 5, and of a plate 6 of non-conductive material into which latter electric charging devices such as capacitors or energized conductors, preferably in the shape of wires 7 have been worked in accordance with the desired patterns. Primarily, the charging devices are wires 7, running parallel with one another. Either all of these wires receive a negative charge, or some a negative and others a positive charge.

The walls 1, 2, 3, 4 and 5 of which the mold 8 for producing the article of synthetic material is composed, consist of a non-conducting material, for example glass. The wall joints are sealed by the interposition of sealing beads.

The end walls 4 and 5 are provided with pine 9, perpendicular to the wall 3, which serve for receiving and guiding the insulating plate 6 with its charging devices.

The device is constructed in such a way that the mold 8 can be easily dismantled and the insulating plate 6 with its pattern-forming charging devices easily exchanged.

Figure 5:
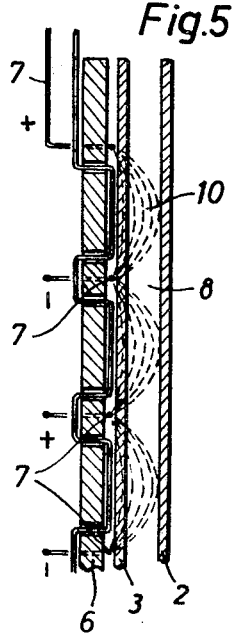
FIG. 5 is a sectional view of the device illustrated in FIG. 4 along the line V—V in which the lines of force have been indicated.

As can be seen especially in FIG. 5, fields of force emanate from the wires 7 whose three-dimensionally curved lines of force 10 penetrate into the mold 8 in which the hard-setting pigmented synthetic material has been filled. In those areas where the wires 7 bear on the wall 3 the lines of force 10 of the fields are inclined strongly relative to the surface of the plastic article 11 to be produced. Therefore the pigments in these areas become oriented perpendicularly, or at a steep angle, to the surface of the object to be produced. Thus, the synthetic material in these areas becomes more transparent because an observer looking on the surface from the above can more or less look past the needle or platelet-shaped crystals which form the pigment. In the intermediate areas between the wires 7, on the other hand, the platelet or rod-shaped pigment crystals orient themselves parallel to the surface so that in these areas the pigments become most effective.

Figure 7A:
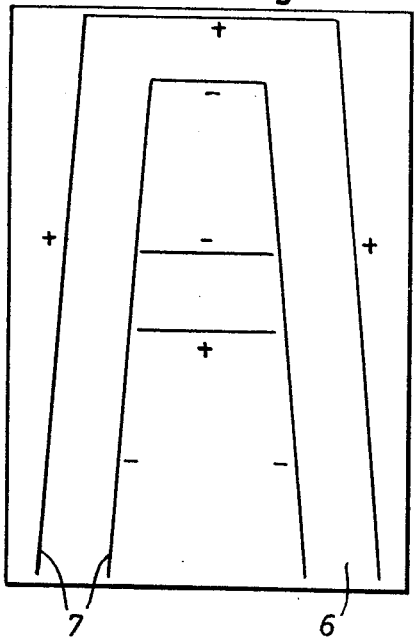
Figure 7B:
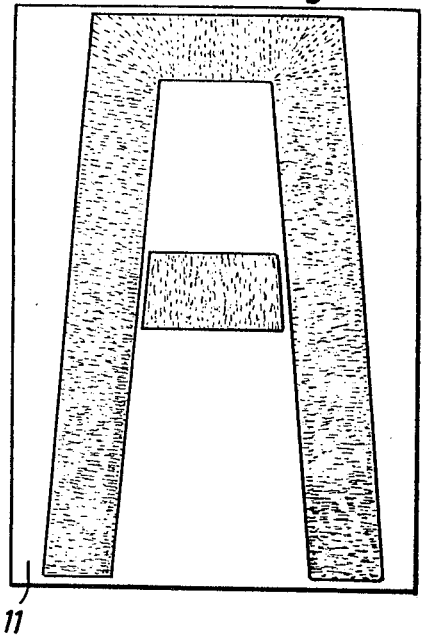

FIG. 7a shows an arrangement of electric conductors 7 on an insulating plate 6 by means of which the letter A can be formed by electrostatic determination of pigment orientation. The energized wires 7 are alternately charged with positive and negative potentials, so that a three-dimensionally curved field of force is established between the wires. FIG. 7b shows the result after the pigmented resin has set. The pigment particles have become oriented in such a way that in the central area between the wires the pigments face the observer with their large surfaces and thus create a maximum of opacity and gloss. Towards the edges, i.e. in the immediate vicinity of the wires where the lines of force penetrate vertically into the mold, the pigment particles have assumed a perpendicular position, that is to say they face the observer end-on. These areas have thus become areas of maximum transparency and are clearly distinguishable from areas of maximum reflection.

Figure 8A:
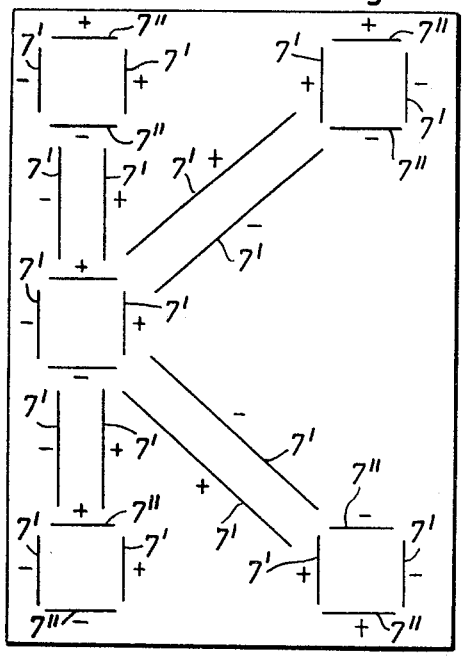
Figure 8B:
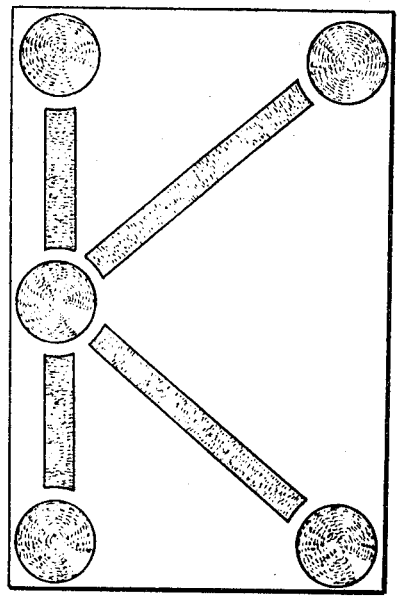
Figure 9A:
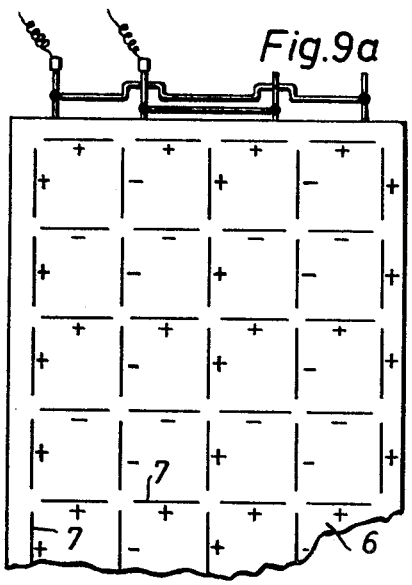
Figure 9B:
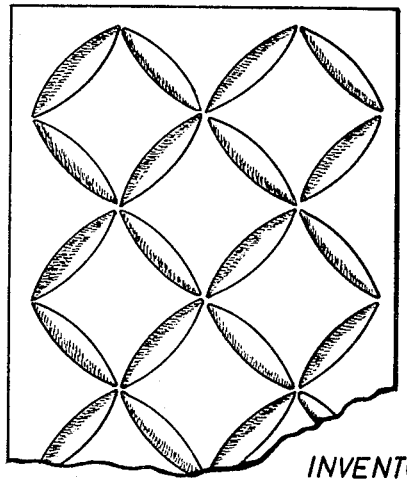

FIG. 8a shows an arrangement of charging devices which allows the formation of the letter K. As can be gathered from the "+" or "—" symbols, some of the energized wires 7 are charged with a positive potential and others with a negative potential. Charging of the wires is carried out with constant alternation such that at first all wires indicated at 7′ are connected to the positive or the negative terminal of an alternating current source of approximately 7,000 volts. Then these current sources are disconnected and all wires indicated at 7″, connected to the same current source. This process is repeated with constant alternation. After a short period spherical configurations and wide lines will appear in the mold containing the colored resins, and these traces become more and more pronounced as the process continues. If a polyester resin or a pre-polymerized methacrylate resin still in the liquid phase is used, the process is usually complete within about 5 minutes. The pigment particles have now assumed a new well-defined position in the areas influenced by the fields of force. After setting, a plate is obtained with a design as shown in FIG. 8b. FIG. 9a shows an arrangement in which the wires 7 are all situated at the edges of squares of equal size. The wires 7 have been mounted on an insulating sheet of polythene in such a way that all parallel running wires are connected from the back of the plate. It is therefore possible when charging with an alternating current source to connect all the wires indicated by a "+" sign to one terminal of the source, and all wires indicated with a "—" sign to the other terminal of the source. If a glass or polythene mold is placed on a system of this type, with the whole assembly preferably contained in a dielectric such as dibutyl phthalate, and the device is brought into intimate contact with the mold and the wires charged in the indicated manner, then patterns such as indicated in FIG. 9b, are obtained in the pigmented resin with which the mold has been filled.

FIG. 10a shows a similar arrangement, but here the wires 7 are charged as indicated in FIG. 10a. Consequently, patterns such as shown in FIG. 10b are obtained.

FIG. 11a shows an insulating plate 6 containing equidistant wires 7 running parallel to one another which are alternately charged with a positive and a negative potential. With such an arrangement and polarization, a synthetic sheet is obtained with longitudinal stripes according to FIG. 11b, the regions of maximum opacity (reflection) being in the central stripe areas. Adjacent to the stripe edges, i.e. in those regions where the wires transmit their lines of force into the resin mixture in an initially perpendicular direction, are situated the areas of maximum transparency.

Figure 12A:
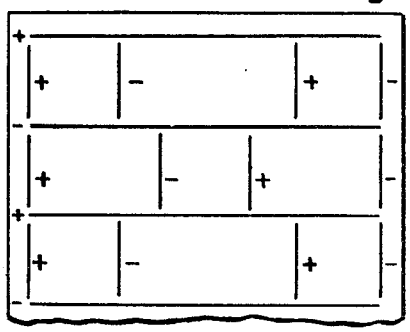
Figure 12B:
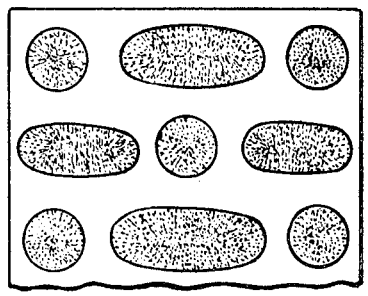

FIG. 12 shows a plate with positively and negatively charged wires 7 which enclose alternately squares and rectangles. With a charging arrangement of this type a pattern is created in the plastic article which is composed of spheres and ellipsoids, as illustrated in FIG. 12b.

Figure 13A:
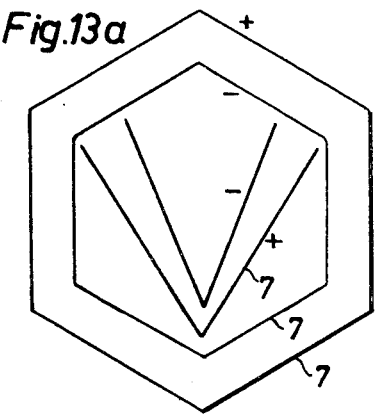
Figure 13B:
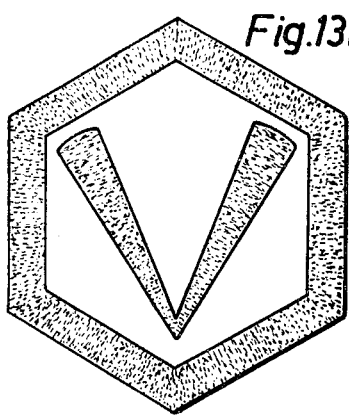

An arrangement of the charging wires 7 according to FIG. 13a results in a design in the synthetic plate such as illustrated in FIG. 13b.

Figure 14:
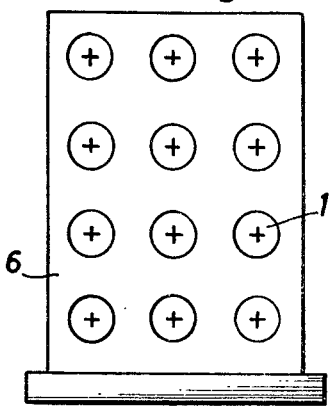
FIG. 14 shows an insulating plate with disc-like capacitors.
Figure 15:
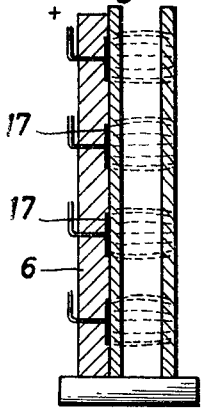
FIG. 15 is a sectional elevation of a mold with an insulating plate according to FIG. 14.
Figure 16:
FIG. 16 is a sectional elevation of a synthetic sheet produced in a device such as illustrated in FIG. 15.

FIGS. 14 and 15 show metal discs 17, worked into an insulating plate 6, all of which can be charged with a potential of identical sign. These capacitors generate fields of force which orient the pigment particles in the synthetic substance in the manner illustrated in FIG. 16.

Figure 17:
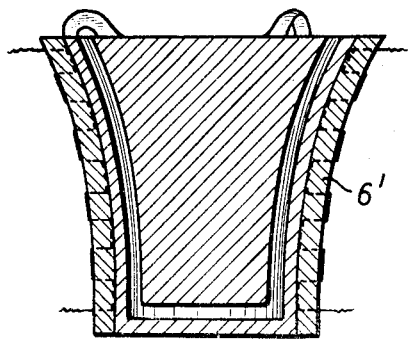
Figure 18:
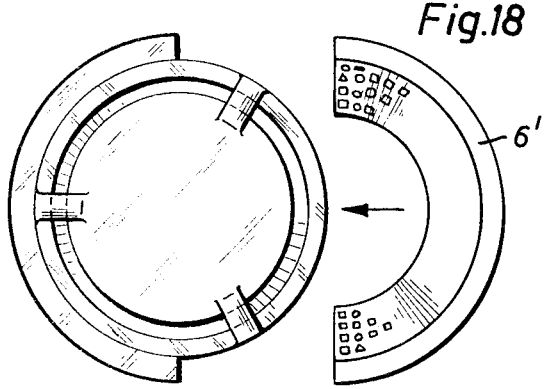
FIG. 18 is a plan view of a mold for producing a cup or vase according to the method of the invention.

FIGS. 17 and 18 show how devices can be constructed in which cups, vases, bowls and like objects of synthetic material can be produced according to the method of the invention. The charging devices—electric conductors or capacitors—are applied to a body 6′ of non-conductive material in such a way that they can be applied either directly, or with the interposition of a dielectric, to the outer surface of the mold wall.

Figure 19:
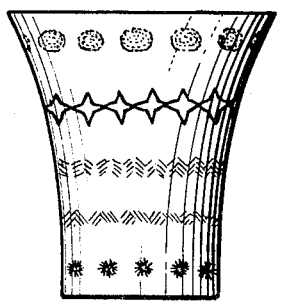
FIG. 19 shows a vase produced of synthetic material in the device illustrated in FIGS. 17 and 18.

FIG. 19 shows a vase such as could be produced in a device illustrated in FIGS. 17 and 18.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of producing a pattern in a body having a substantially flat face and formed of a hardenable synthetic resin having electrically orientable particles distributed therein, comprising the steps of placing adjacent to said flat face and spaced from each other at least two electric field generating electrode means each including an electrode and said means having different potentials so as to create within said body between said electrodes a curved electric field of force in such a manner that the lines of electric force will enter said flat face of said flat body at a steep angle and curve within said body so as to be located halfway between said electrode substantially parallel to said flat face, whereby said electrically orientable particles in said hardenable synthetic resin will assume in the regions of said electrodes a steep angle of inclination relative to said flat face and will be directed halfway between said electrodes substantially parallel to said flat face with the angles of inclination between said flat face and the respective particles decreasing from the angle of inclination of those particles which are located in the regions of said electrodes to the angle of inclination of those particles which are located halfway between said electrodes so as to form within said hardenable synthetic resin body a substantially arc-shaped pattern of electrically orientable particles curved relative to said flat face of said body; and thereafter hardening said hardenable synthetic resin so as to form a body of hardened synthetic resin with said particles firmly embedded therein and forming a substantially arc-shaped pattern curved relative to said flat face of said body.

2. A method as defined in claim 1, wherein said electrically orientable particles are pigment particles.

3. A method as defined in claim 1 wherein said electric field is an alternating field.

4. A method as defined in claim 3, wherein said electric field is generated by potentials of between 100 and 30,000 volts.

5. A method as defined in claim 3, wherein more than two electric field generating electrode means are placed adjacent to said flat face so as to create within said body a plurality of said curved electric fields of force of respectively different configuration.

6. A method as defined in claim 5, wherein said plurality of electric fields of force is sequentially created so that the first of said electric fields of force will cause orientation of said electrically orientable particles, and a subsequently created electric field of force will cause reorientation of said electrically orientable particles to form a desired pattern.

References Cited

UNITED STATES PATENTS 3,073,732   1/1963   Hunsdiecker _____ 264—24

ROBERT F. WHITE, Primary Examiner

G. AUVILLE, Assistant Examiner

U.S. Cl. X.R.

264—108